US012762868B2

(12) United States Patent
Filimonov et al.

(10) Patent No.: US 12,762,868 B2
(45) Date of Patent: Oct. 13, 2026

(54) METHOD FOR PREDICTING TURN POINTS

(71) Applicant: Harman International Industries, Incorporated, Stamford, CT (US)

(72) Inventors: Andrey Viktorovich Filimonov, Kamenki (RU); Dmitry Vladimirovich Gorbunov, Dzerzhinsk (RU); Dmitry Aleksandrovich Yashunin, Nizhny Novgorod (RU); Tamir Igorevich Baydasov, Nizhny Novgorod (RU); Yuliya Gennadevna Kukushkina, Nizhny Novgorod (RU)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 264 days.

(21) Appl. No.: 18/292,862

(22) PCT Filed: Jul. 28, 2021

(86) PCT No.: PCT/RU2021/000320
§ 371 (c)(1),
(2) Date: Jan. 26, 2024

(87) PCT Pub. No.: WO2023/009022
PCT Pub. Date: Feb. 2, 2023

(65) Prior Publication Data

US 2024/0362926 A1 Oct. 31, 2024

(51) Int. Cl.
*G06V 20/56* (2022.01)
*G06V 10/82* (2022.01)

(52) U.S. Cl.
CPC ............ *G06V 20/588* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 10,671,076 | B1 * | 6/2020 | Kobilarov | G08G 1/166 |
| 10,800,455 | B2 * | 10/2020 | Micks | B62D 6/00 |

(Continued)

OTHER PUBLICATIONS

Brownlee, J., "Train Neural Networks With Noise to Reduce Overfitting," Machine Learning Mastery Website, Available Online at https://machinelearningmastery.com/train-neural-networks-with-noise-to-reduce-overfitting/, Aug. 6, 2019, 23 pages.

(Continued)

*Primary Examiner* — Anand P Bhatnagar
(74) *Attorney, Agent, or Firm* — McCoy Russell LLP

(57) ABSTRACT

Computer-implemented method for predicting one or more turn points related to a road a vehicle is travelling on, the one or more turn points indicating locations where the vehicle can change direction, the method comprising: obtaining training images of roads and their environment; receiving labels associated with the roads in the training images, each label comprising a training turn marker; training an artificial neural network on a training dataset to predict one or more turn points, wherein the training dataset comprises the received labels and the obtained training images; recording at least one road image of a road and its environment; and processing the road image by the artificial neural network to predict one or more turn points on the road image.

18 Claims, 10 Drawing Sheets

(56) References Cited

U.S. PATENT DOCUMENTS

| | | | | |
|---|---|---|---|---|
| 10,816,993 | B1 * | 10/2020 | Tran | G06N 3/045 |
| 10,990,105 | B2 * | 4/2021 | Chen | G05D 1/0221 |
| 10,990,815 | B2 * | 4/2021 | Hou | G06V 20/588 |
| 11,023,749 | B2 * | 6/2021 | Garimella | B60W 30/18163 |
| 11,068,724 | B2 * | 7/2021 | Liu | G08G 1/167 |
| 11,370,423 | B2 * | 6/2022 | Casas | G06V 10/82 |
| 12,367,681 | B2 * | 7/2025 | Yang | G06T 5/80 |
| 2017/0131719 | A1 * | 5/2017 | Micks | G08G 1/161 |
| 2018/0164812 | A1 * | 6/2018 | Oh | G06T 7/70 |
| 2019/0311298 | A1 * | 10/2019 | Kopp | G01C 25/00 |
| 2020/0026282 | A1 * | 1/2020 | Choe | G05D 1/0257 |
| 2020/0160068 | A1 | 5/2020 | Silver et al. | |

OTHER PUBLICATIONS

Cvijetic, N., "At a Crossroads: How AI Helps Autonomous Vehicles Understand Intersections," NVIDIA Blog Website, Available Online at https://blogs.nvidia.com/blog/drive-labs-how-ai-helps-autonomous-vehicles-understand-intersections/, May 27, 2020, 10 pages.

ISA European Patent Office, International Search Report and Written Opinion Issued in Application No. PCT/RU2021/000320, Apr. 25, 2022, WIPO, 16 pages.

* cited by examiner

METHOD FOR PREDICTING TURN POINTS

CROSS-REFERENCE TO RELATED APPLICATIONS

The present application is a U.S. National Phase of International Application No. PCT/RU2021/000320, entitled "METHOD FOR PREDICTING TURN POINTS", and filed on Jul. 28, 2021. The entire contents of the above-listed application are hereby incorporated by reference for all purposes.

FIELD

The present disclosure relates to devices, methods, and systems for predicting turn points. The turn points are related to a road a vehicle is travelling on. They indicate locations where the vehicle can change direction. The disclosure is applicable in the field of vehicle electronics, in particular vehicle navigation, augmented reality, and/or autonomous driving.

BACKGROUND

The present disclosure relates to determining turn points, i. e. positions where a vehicle can change direction. Turn points may be included in high-resolution electronic maps of a part of the surface of the earth. Therefore, there is an interest in methods for determining turn points.

SUMMARY

Disclosed and claimed herein are systems, methods, and devices for predicting one or more turn points related to a road a vehicle is travelling on, the one or more turn points indicating locations where the vehicle can change direction.

A first aspect of the present disclosure relates to a computer-implemented method for predicting one or more turn points related to a road a vehicle is travelling on. The one or more turn points indicate locations where the vehicle can change direction. The method comprises:

- obtaining training images of roads and their environment;
- receiving labels associated with the roads on the training images, each label comprising a training turn marker;
- training an artificial neural network on a training dataset to predict one or more turn points, wherein the training dataset comprises the received labels and the obtained training images;
- recording at least one road image of a road and its environment; and
- processing the road image by the artificial neural network to predict one or more turn points on the inference image.

The method thereby comprises a training phase comprising obtaining the training images, receiving the labels, and training the artificial neural network. The method further comprises an inference phase comprising recording and processing the one or more road images.

The training images show at least a road. A road refers to a way that comprises a surface which can be used by moving vehicular traffic, in particular one or more lanes. The part of the road usable by vehicular traffic is referred to as a carriageway. The road may further comprise parts that are inaccessible for vehicles, such as pedestrian walkways, road verges, and bicycle lanes. The road may further include parking spaces, which are accessible to vehicles but not adapted for driving and thus do not form part of the carriageway.

The training images show the road preferably from the point of view of a vehicle traveling on the road. The images may be recorded by a vehicle-mounted camera. Alternatively, other sources of images may be used, such as collecting images from third parties. The images may also be taken manually. Preferably, photographs or video images are used. Alternatively, computer-generated images may be used. The training turn markers may be assigned manually, or by an algorithm, for example a classifying algorithm. For example, labels may be generated automatically and verified manually before being used for training. However, fully manual labelling is possible.

Changing travelling direction may refer to leaving the carriageway of the main road (i. e. the carriageway the vehicle is initially driving on) and continue driving on another road (e. g. at a crossroads or an intersection), or to parking in a parking space. In contrast, following a curve of the road that the vehicle is moving on is not considered changing direction as long as the vehicle is moving on the carriageway, in particular on one of the lanes for vehicular traffic.

In an embodiment, each training turn marker comprises a turn point.

A turn point marks a position on a border of the road at which a turn can be performed. Turn points are to be predicted by the artificial neural network and its output can be used as an input for another system, for example in a navigation system comprised in a vehicle. Navigation systems typically use maps to locate the current position of the vehicle and to show a position where a turn is possible. In a conventional system, if a position is inaccurately indicated on a map, the navigation system may fail to inform a driver at which precise position a turn can be taken, e. g. where a junction is located. Determining the position by processing the images of a forward-facing camera of the vehicle by the artificial neural network allows correcting the position, updating inaccurate map data, and giving more precise indications to a driver. The data may furthermore be used as an input for an augmented reality display system that is configured to show a virtual road sign superimposed over the traffic scenery. In autonomous driving, determining the turn point may allow the vehicle to take precise turns.

In a further embodiment, each training turn marker comprises a turn line indicative of a road border section where a vehicle can change travelling direction.

A road border section indicates a section of a road border. A road border refers to an outer border of the part of the road that is usable by vehicular traffic. A road border may comprise a carriageway edge, a curb, or a temporary road fence. For example, if a road has four lanes for vehicles and a pedestrian walkway, the outer borders of the outer lanes are road borders. In this example, in the absence of intersections, the border between an outer lane and the pedestrian walkway is a road border. However, in this example, at an intersection or a crossroads joining the outer lane, the border between the outer lane and the joining road also forms part of the road border. At this section of the road border, where the road border is a border between the outer lane and the adjacent road, the vehicle can typically change travelling direction, i. e. take a turn onto the adjacent road. Such a road border section is preferably indicated by a turn line, except for the special cases set out below. Thereby, the turn line indicates a part of a boundary of a carriageway that can be crossed by a vehicle leaving the carriageway. Consequently, a vehicle leaving the carriageway crosses only one turn line. Examples of road border section where a vehicle can change travelling direction include roundabouts and junctions, in particular crossroads and intersections.

In this embodiment, the turn lines are either processed by the artificial neural network itself, or the turn lines are converted into turn points in a pre-processing step.

In a further embodiment, the method further comprises determining, for each turn line, a turn point at the centre of the turn line.

In particular, if in the training phase, the training turn marker comprised in the training dataset is a turn line, then the turn point may be determined at the centre of the turn line before the step of training the artificial neural network. Thereby, the turn lines, which can be marked more accurately on an image, are first determined. Preferably, this may be done manually. The turn lines can then be algorithmically transformed into training turn points by determining the position of the turn points at the centre of the turn line. Determining the position at the centre of the turn line may be subject to perspectivic corrections. The artificial neural network then receives the training turn points as an input dataset to be trained to predict the position of turn points on a road image. In an alternative embodiment, the artificial neural network may transform the turn lines into turn points, preferably by one or more layers comprised in the artificial neural network.

In a further embodiment, a turn line indicates the road border section only if the beginning and the end of the road border section are visible on the training image.

Thereby, the artificial neural network is trained to predict the turn markers only if the exact position of the beginning and the end of the road border section are visible. In contrast, cases are excluded in which the beginning and/or the end of the road border section is invisible because it is outside the image, or because it is occluded by an object, such as a parked vehicle. This improves the reliability of the method.

In an example, the training dataset is generated manually by trained people (expert evaluators) who label the training images according to a set of labelling rules. The labelling rules include defining a turn line if the beginning and the end of the road border section are visible. The labelling rules need not be processed by the artificial neural network, neither in the training phase nor in the inference phase. Rather, labelling rules represent conditions for the training dataset.

In a further embodiment, a turn line indicates a road border section comprising a section of a road border of a main road, where the main road forms a junction, an intersection, or a crossroads to a crossed road; and/or where an exit of a main road is blocked by a temporary barrier and/or traffic signage blocking traffic.

A turn line, which indicates a road border section, is thereby comprised in the training dataset if at least one of the above conditions applies. This means that the artificial neural network can be trained to predict turn lines at positions determined by physical properties of the road: At a junction, an intersection, or a crossroads, the curb or other physical barrier that limits the carriageway is interrupted by the crossed road. Thereby, the artificial neural network is trained to predict the turn points depending on where a vehicle can take a turn. In contrast, traffic regulations, street signs, road marking lines, temporary barriers such as bollards and gates are ignored. The artificial neural network is thereby trained to place a turn marker according to image features that indicate the presence or absence of physical road barriers and thus allow distinguishing if the vehicle can change direction.

According to this embodiment, labelling rules may comprise conditions to generate the turn lines if any of these conditions are met. In illustrative examples, labelling rules may provide labelling a turn line also in cases where taking a turn at a turn line relates to crossing temporary barriers, and/or crossing the line is possible but forbidden by the applicable traffic laws and regulations. An example would be an exit of a one-way street which can be physically entered, although this is forbidden for most or all vehicles. This property of the training dataset allows the artificial neural network to be trained to recognize physical properties of the street, rather than traffic regulations, which may or not may be visible on the image. Another example would be a street normally accessible to traffic but temporarily closed due to construction works, which could be visible from signs, road marking lines, temporary road fences, barriers, bollards, or gates. In this case, the artificial neural network is trained to ignore the temporary barriers and/or No entry signs.

In an illustrative example, a turn line is not included at a central reservation (or median strip) that separates the lanes for the two opposing directions if the median strip is only indicated by lines on the road surface. In this case, the carriageway includes the lanes in both directions. This makes the artificial neural network more reliable in predicting the road based on physical features of the road.

In a further embodiment, a turn line does not indicate a road border section of a main road where one or more of the following apply:

The main road is crossed by a crosswalk.

The main road is curved without comprising any of a junction, intersection or crossroads.

An edge of a road that is not an edge of a carriageway of the road.

Accordingly, in this embodiment, negative criteria are defined for the presence of a turn line. A pedestrian crosswalk is adapted for use by pedestrians and can generally not be used by vehicles. Furthermore, if vehicles are following a road which is curved, then this is not considered a turn, i. e. this is not a change in direction. Therefore, no turn lines are indicated here. Furthermore, an edge of a road that is not an edge of a carriageway of the road is not considered. That is, any road border section is situated on an outer boundary of a carriageway. In contrast, if there is a verge, i. e. a strip covered by plants, such as grass, beside the carriageway, then the outer border of the verge is not considered a road border. In this exemplary case, the verge is interrupted at an intersection, and the road border section extends from a first border between the carriageway and the verge and a second border between the carriageway and the verge. The turn line related to the intersection is then situated at said road border section. No second turn line at the outer border of the verge is included. This allows defining turn lines unambiguously.

In another illustrative example, a turn line is not included if a road border section is at a high distance. This avoids the case that a turn line is defined for a part of the image that has a low resolution.

In another illustrative example, the road border section is chosen to connect the other parts of the road border. That is, the road border section has the same orientation as the road border, even if the crossed road joins the main road at an oblique angle. In an alternative example, this may not be possible. In particular if a road ends in a T-shaped or Y-shaped junction, several sections leading to the different roads may be adjacent. In this case, the turn lines are situated at the end of the road, perpendicularly to the traffic that crosses them.

In a further embodiment, the training images include training images with randomly added shadows, colour transformations, horizontal flipping, blurring, random resizing and/or random cropping.

Generating according training images thus constitutes a pre-processing step, wherein images are modified to improve the accuracy of the turn point prediction by the artificial neural network.

In a further embodiment, the artificial neural network comprises an output layer comprising outputs indicative of heat maps indicative of one or more of turn lines, turn points, and road segments.

The heat maps may, for example, indicate a probability that a turn line, a turn point, or a road segment is located at a given position. This allows outputting more reliable information than indicating only one point as a pair of position values.

In a further embodiment, the method further comprises, for each heat map:

applying a step function to set values below a predefined threshold to zero and all other values to one, determining one or more contiguous zones of non-zero values, and for each zone, determining a centre of mass position of the zone as a turn point.

Thereby, the heat maps are post-processed in a way that yields a stable position of a turn line. That is, if consecutive images of a video feed are analysed, the position of the turn point does not jump from one image to another. In an example, in the inference phase, only the heat maps for the turn points are used, since the other outputs of the artificial neural network are not necessary for post-processing. A preferable value of the threshold is of 50%, for which the resulting centre of mass is sufficiently stable.

In a further embodiment, the method further comprises applying a Gaussian filter to the labels of the training dataset.

Accordingly, the labels comprise heat maps indicating a probability of the turn point being situated at a position. Individual turn points are replaced by Gaussian bell-shaped two-dimensional functions. Therefore, a larger number of pixels of an image is labelled compared to the use of turn point labels with no Gaussian filter being applied. That means that the ground truth labels are smoothed, which reduces the class imbalance in the training dataset. Thereby, the pixel localization of the predicted turn points is more accurate.

In a further embodiment, training the artificial neural network comprises minimizing a mean squared error of the predicted turn points with respect to the training turn markers.

Thereby, training minimizes a distance between the predicted turn points and the training turn points that form the ground truth. Minimizing the error may be done by supervised learning, e. g. backpropagation, as known in the art.

In a further embodiment, the steps of recording the inference image of a second camera as an inference dataset, and processing the inference dataset are executed by a computer attached to or comprised in a mobile device.

The mobile device may be comprised in a navigation system of a vehicle to improve the prediction accuracy of the position of turn lines.

According data are typically included in electronic maps, but their accuracy is limited by the quality of data collection and satellite navigation systems. The navigation system may take the output data generated in the inference phase as an input to improve the accuracy of known positions of turn line.

In a further embodiment, the method further comprises determining a confidence value for the predicted turn points on the one or more road images, comparing the confidence value with a predetermined threshold, and including the one or more road images into the training dataset if the confidence value below the threshold.

The confidence value can be determined by comparing the prediction of the artificial neural network to known data, such as maps that indicate positions of intersections. In case of a low confidence value, the data are included in a training dataset for a further training process, i. e. selected for manual labelling and training and supplied to the artificial neural network for a further training process. In particular, the confidence value may be calculated by a vehicle-mounted navigation system that processes the data in an inference phase to determine precise positions of intersections for which coarse positions are already available on maps. The navigation system may determine the confidence value to indicate low confidence if a junction is shown far away from a known intersection, or if repeated prediction by the artificial neural network in the inference phase yields, for repeated processing of images of the same junction, comparably high differences each time the image of the junction are processed. The confidence value may comprise a Boolean value, or a numeric value indicating a probability of a turn point being correctly indicated.

In a further embodiment, the method further comprises displaying the second image and/or other environmental data, superimposed with graphical and/or text output based on the predicted turn points.

In such an augmented reality type setup, the turn points are used to display information. For example, a representation of a street sign can be shown in proximity to a turn point.

In a further embodiment, the training dataset further comprises:

at least one label indicating a boundary of at least one image segment and/or for each image segment, a label for a segment type indicating an object represented by the segment; and wherein training and/or processing includes predicting boundaries and/or types of image segments.

The artificial neural network thus executes a segmentation task on the image. The artificial neural network thus identifies image segments, which may depict a carriageway, a lane, a median strip, a vehicle, or a road sign. The turn lines may then be comprised in the borders between the segments. Input and output layers of the artificial neural network may thus comprise inputs and outputs for the turn points, turn lines, and segments. During the training phase, the artificial neural network may be trained to predict both turn lines and turn points and optionally segments. During the inference phase, in principle, turn lines and turn points and optionally segments can be predicted. However, preferably only the turn points are predicted. They can be used, for example, as input data for a navigation system or an autonomous driving system.

In a further embodiment, predicting boundaries and types of image segments comprises application of online hard example mining. Thereby, images that do not contain much information about the boundaries are filtered out and the artificial neural network is trained on significant data. This increases the efficiency. Alternatively or additionally, training comprises applying a binary cross-entropy loss function. Such a loss function increases the efficiency of training for the prediction of the turn markers.

In a further embodiment, the method further comprises recording the training and/or inference images by a vehicle-mounted camera.

Upon inference, data may be processed by an autonomous driving system and/or a navigation system. Images may be taken by a vehicle-mounted camera to yield the road images as an input for the inference phase. The training images may be collected in the same way and sent to a network-accessible server for training.

In a further embodiment, the method further comprises recording the training images at a fixed frame rate, and removing each training image if it depicts the same junction as a second training image.

These steps allow preparing the training images such that the training dataset exhibits low redundancy. A preferable value for the frame rate is around one frame per second. Removing frames that show the same junction increases the entropy of the dataset.

A second aspect of the present disclosure relates to a system for predicting turn points indicating locations where the vehicle can change direction. The system comprising means for executing the steps of any of the preceding claims. The means may include one or more processors, one or more memory devices, one or more cameras, and/or one or more further input and/or network devices. All properties and embodiments that apply to the first aspect also apply to the second aspect.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1:
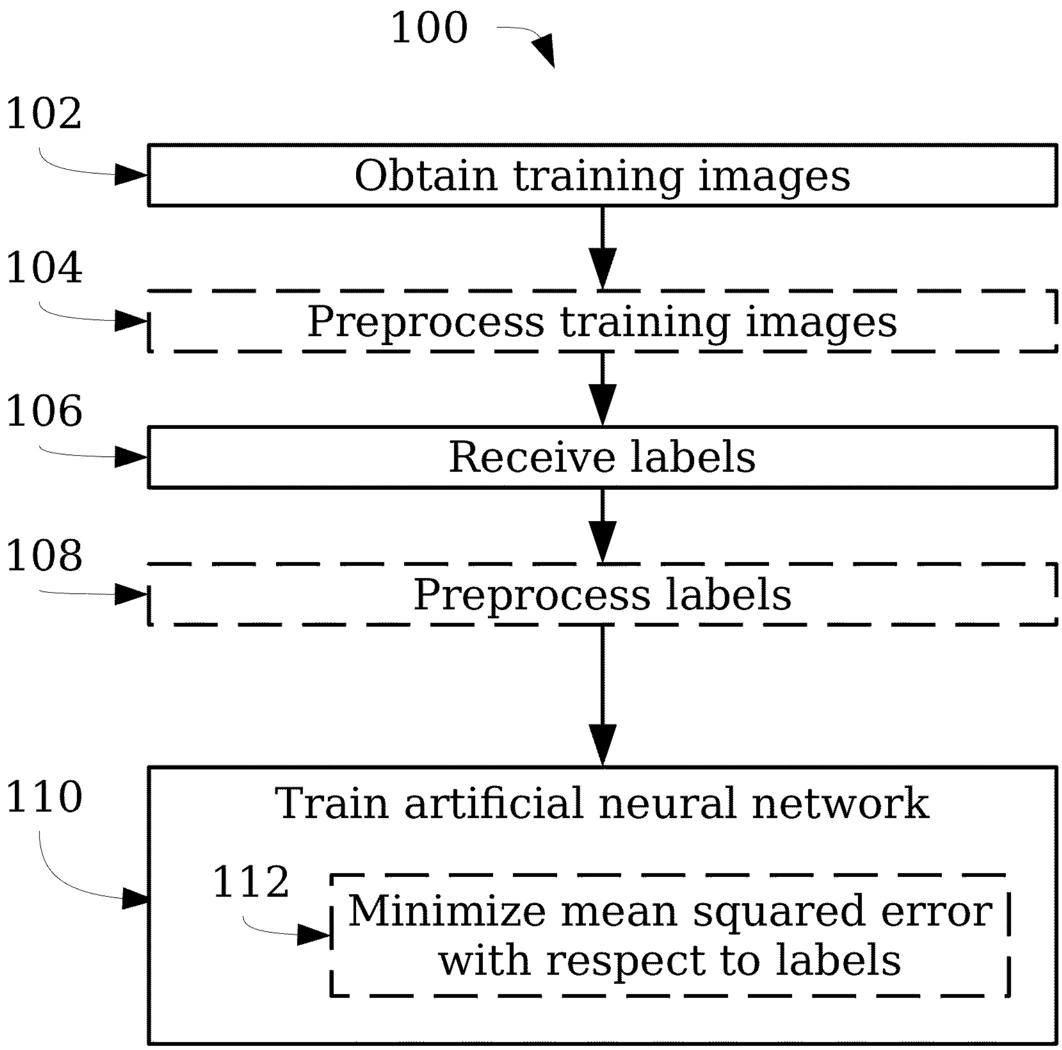
FIG. 1 shows a flow chart of a computer-implemented method for training an artificial neural network.

FIG. 1 shows a flow chart of a computer-implemented method 100 for training an artificial neural network. The method 100 begins by obtaining training images of roads and their environment. The training images can be taken, for example, with a vehicle-mounted camera. Alternatively, training images can be collected from a variety of sources. The images are preferably photographs to train the artificial neural network to predict turn lines on photographs. A plurality of optional pre-processing steps can be done, 104. Examples include randomly added shadows, colour transformations, horizontal flipping, blurring, random resizing and/or random cropping. This improves the reliability of the turn point prediction. At 106, labels are received. The labels are associated with the roads in the training images. Each label comprises a training turn marker. A training turn marker may include a turn point or a turn line. Optionally, the labels are pre-processed, 108. Pre-processing the labels may include the application of a Gaussian filter to the labels of the training dataset. The Gaussian filter smears out the labels and thereby reduces the class imbalance on the images. Alternatively or additionally, the labels may be pre-processed by converting turn lines into turn points, for example by replacing each turn line by a turn point in the centre of the turn line, preferably applying perspectivic corrections. The image and the labels are then sent to an artificial neural network for training, 110. Training may include minimizing, 112, a mean squared error of the predicted turn points with respect to the training turn markers.

Figure 2:
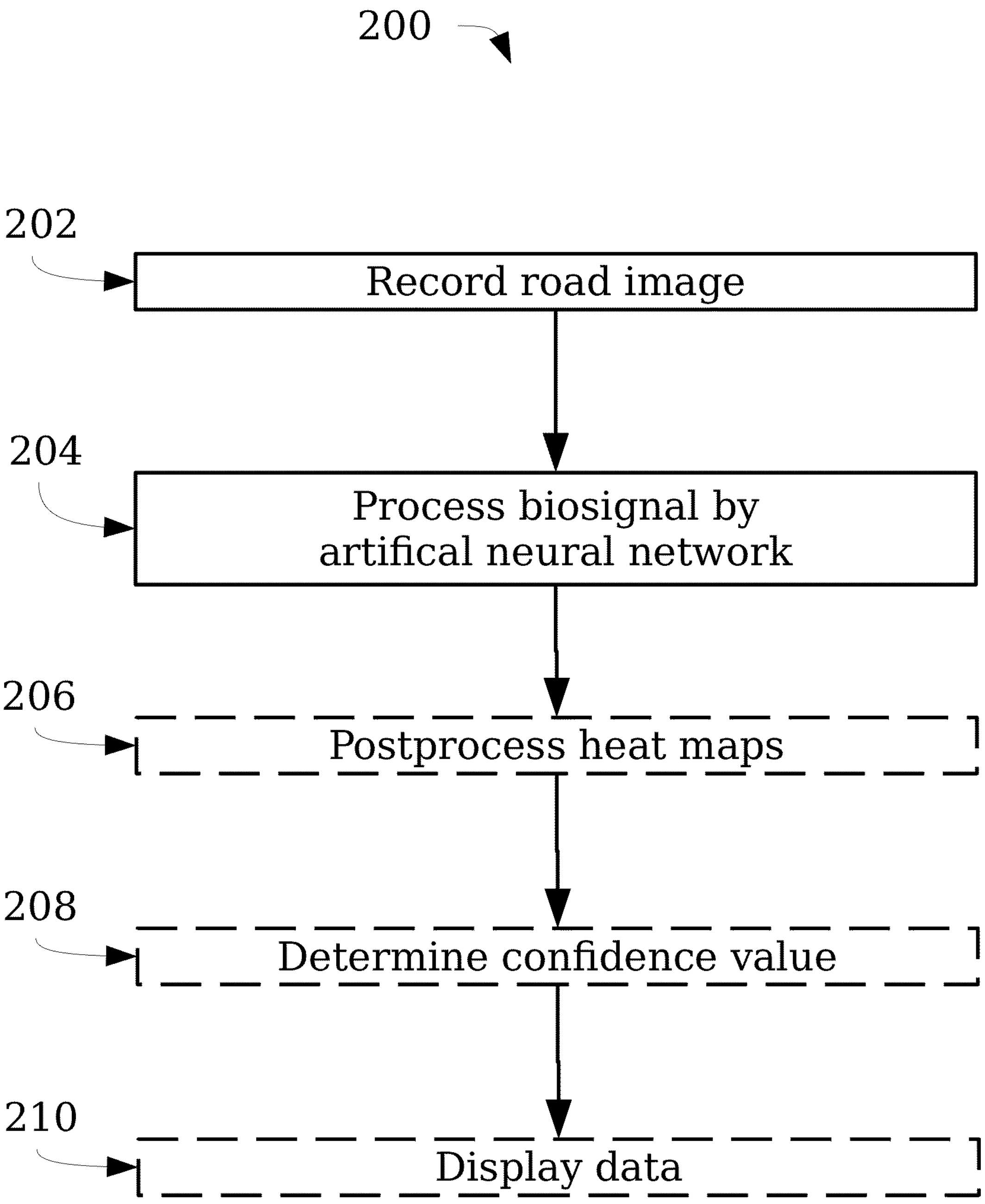
FIG. 2 shows a flow chart of a computer-implemented method for an inference phase of an artificial neural network.

FIG. 2 shows a flow chart of a computer-implemented method 200 for an inference phase of an artificial neural network. The method 200 includes recording, 202, at least one road image of a road and its environment. Optionally, a plurality of images can be taken as part of a video, for example when processing a live video stream. In an illustrative example, the images are taken with a vehicle-mounted camera, and the method is to determine the positions of turn points such that an autonomous driving system can control the vehicle. In this context, the method may form part of an autonomous driving system. However, the method is not limited to this application and can be run on any suitable hardware, which includes image input, processor, and memory.

The artificial neural network processes, 204, the images to predict one or more turn points on the road image. The output can comprise coordinates of turn points, but preferably heat maps that show, depending on position on the image, a probability of a presence of a turn point.

Optionally, the results can be post-processed, 206. Post-processing can include, in an example, applying a step function to set values below a predefined threshold to zero and all other values to one. A typical value for a threshold is at 50% of the maximum. In this example, post-processing may further include determining one or more contiguous zones of non-zero values, and for each zone, determining a centre of mass position of the zone as a turn point. Thereby, the centre of mass position is stable with respect to minor changes between images of a video stream.

In a further optional step, a confidence value can be determined for the predicted turn points, 208. This can be done, for example, by comparing the determined turn points to existing high-resolution maps of the scene recorded at step 202. If the confidence value is determined below a predefined threshold, the image may be selected for training the artificial neural network, which includes determining training markers independently from the artificial neural network (e. g. by manual labelling), and training the artificial neural network on a training dataset comprising the image, for example by method 100.

In a further optional step, the turn point can be used as an input for a display system. The display system can yield a rendering of the image with the turn point shown on the image. In addition or alternative, the display system may comprise an augmented reality system that superimposes information, depending on the position of the turn points, with the reality. For example, images of street signs may be projected into a windshield of a vehicle at a position of a turn point to inform the driver at which position an intersection is located, and which street is crossing. In addition or alternatively to this kind of on-the-fly generation of turn points, the turn points can also be saved in a high-resolution map.

Figure 3:
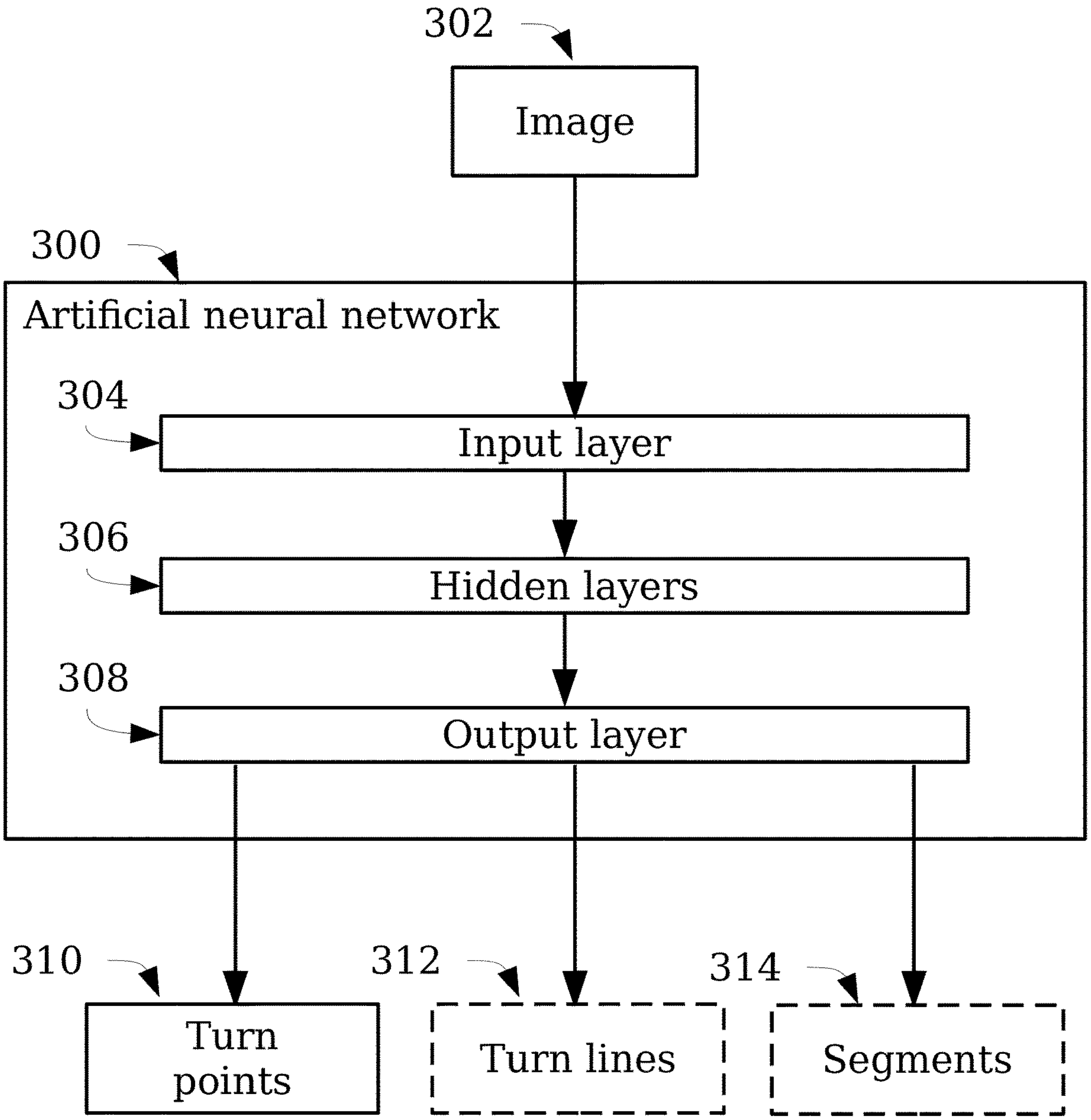
FIG. 3 shows a block diagram of an artificial neural network and related data.

FIG. 3 shows a block diagram of an artificial neural network 300 and related data. An image 302 serves as input data. The artificial neural network 300 may comprise a convolutional neural network. In general, a modified version of any segmentation CNN architecture may be used. As an example, a modified version of the HRNetV2-W48 (or W18 etc.) network, based on HRNet architecture may be used. The artificial neural network 300 may comprises an input layer 304, one or more hidden layers 306, and an output layer 308. In the example, the output layer comprises three channels that predict heat maps of turn points 310, turn lines 312, and road segmentation 314. The information 314 on road segments may include boundaries and types of segments. Preferably, only two types of segments are chosen, the first type designating a segment related a road or part of a road, and the second type designating a segment not related to a road or part thereof. For training, e. g. by method 100, all output can be used for training the artificial neural network by supervised learning. In an inference phase, e. g. method 200, the turn point data 310 are used, but the other outputs may remain unused.

Figure 4:
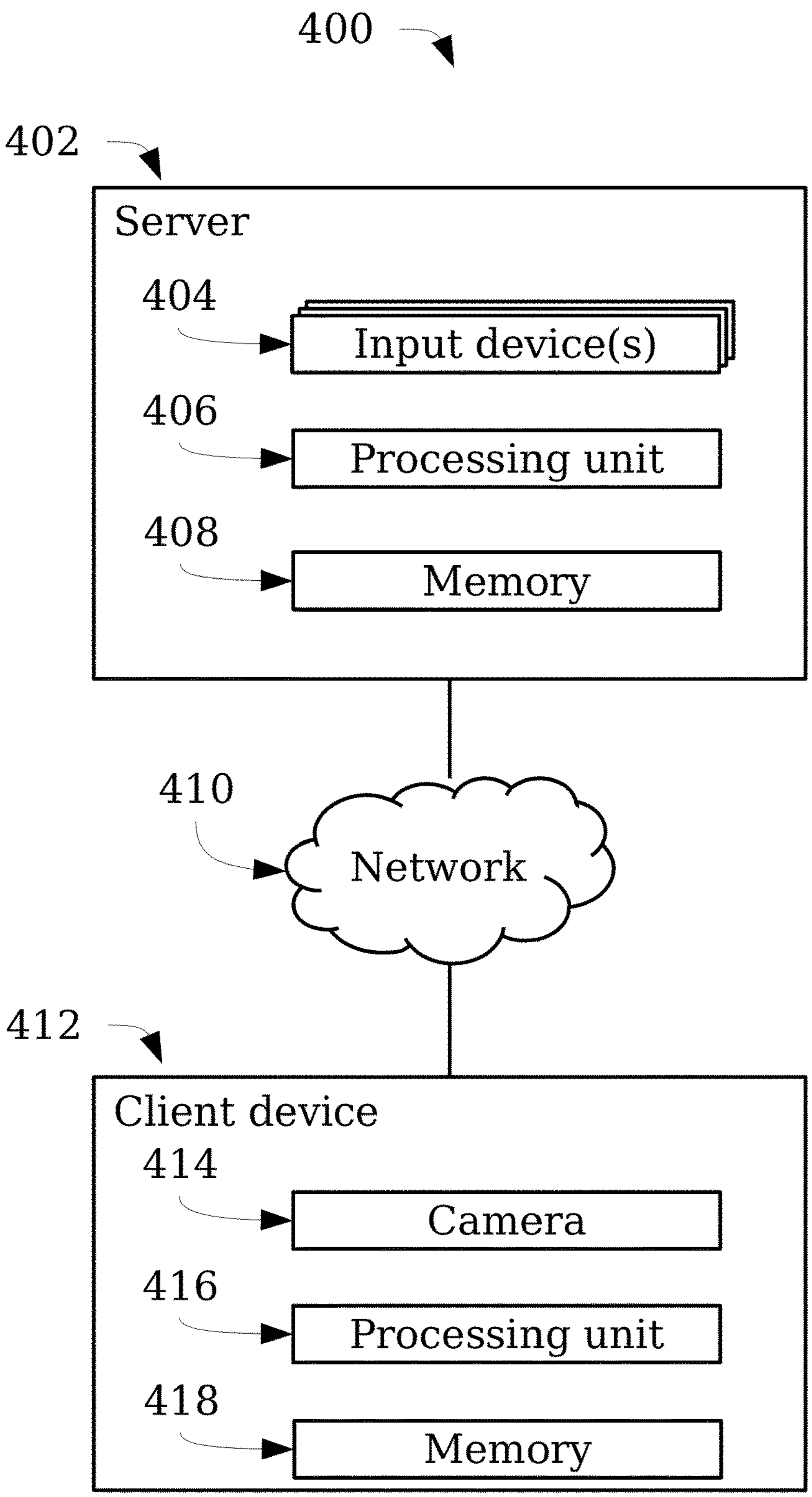
FIG. 4 shows a block diagram of a system 400.

FIG. 4 shows a block diagram of a system 400 according to an exemplary embodiment. The system comprises a server 402, which is adapted to train the artificial neural network. The server may be a single computer, but it may also comprise a plurality of devices connected by a network. The server 402 may comprise one or more input devices 404 for images and for labels. Input devices 404 may thus comprise cameras and human interface devices, but alternatively, network adapters for receiving data from remote computers may be used. The processing unit 406 and the memory 408 execute the method 100 for training. Optionally, the server may execute the inference phase method 200, for example for verifying the results of a training phase.

A client device 412 in this embodiment is connected to the server 402. The client device may be comprised in a mobile device, for example a mobile device attached to or comprised in a vehicle. However, also other client devices are possible. The client device comprises a camera 414 to record one or more images, and a processing unit 416 and a memory 418 to process the images, e. g. by method 200. The resulting turn points can then be sent to other devices, such as a navigation system. The navigation system can then use the turn points to correct information on turn points already present on a map. Parts of the client device 412 can be integrated into a central computer (on-board unit) of a car.

The server 402 may be adapted to send updated versions of the weights for the artificial neural network to the client device 412 via the network 410. The client device may be adapted to send images with low confidence to the server to allow the images to be used for training. Furthermore, updated versions of high-resolution maps comprising the turn points may be distributed via the network.

Figure 5:
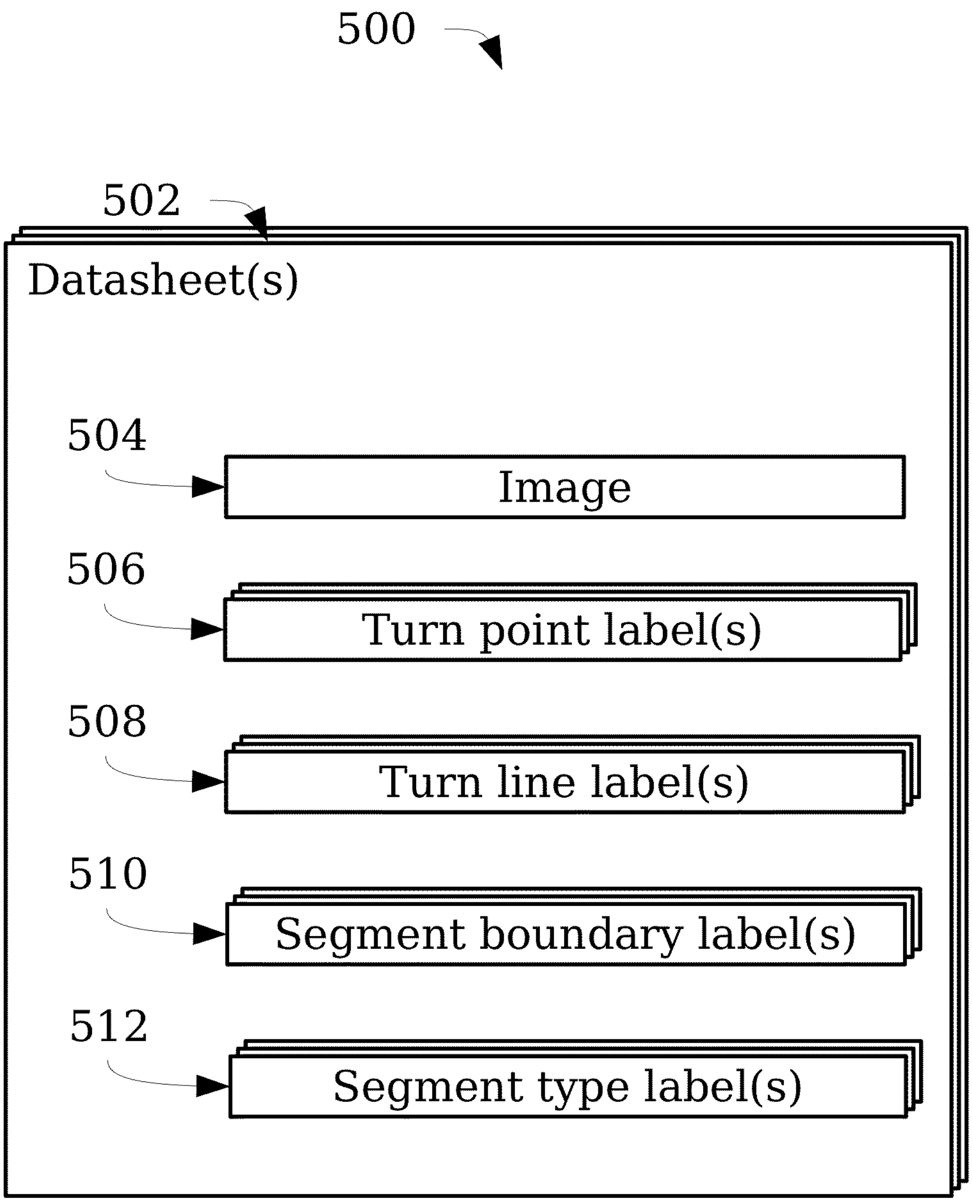
FIG. 5 shows a block diagram of a training dataset.

FIG. 5 shows a block diagram of a training dataset for training the artificial neural network. The training dataset comprises one or more datasheets 502 comprising an image 504 of a road and one or more markers related to the road. The markers include turn point labels 506, turn line labels 508, segment boundary labels 510, and/or segment type labels 512.

Figure 6:
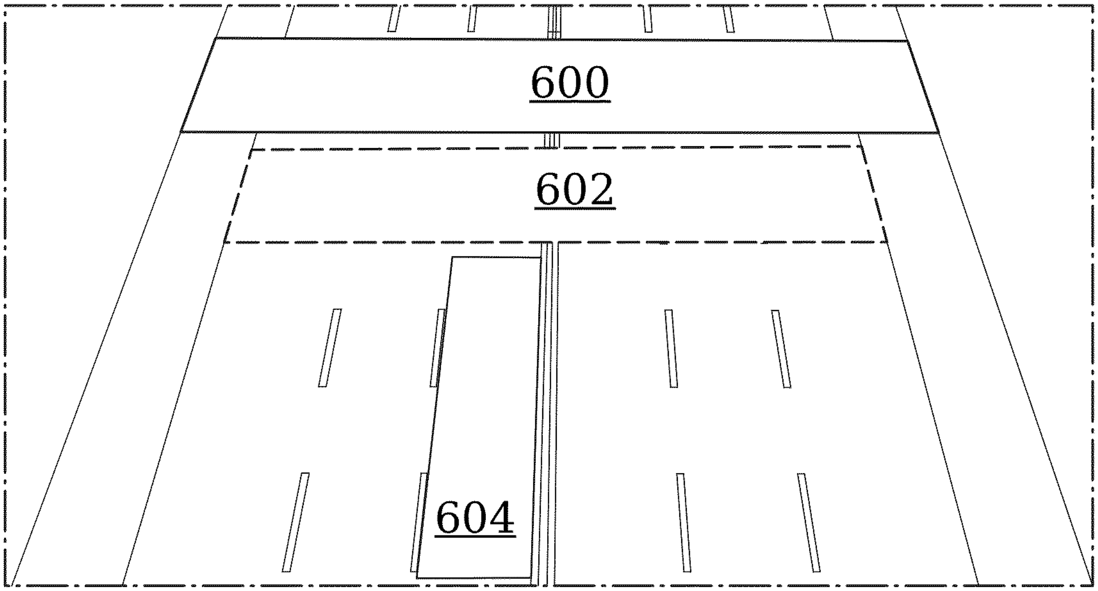
FIGS. 6-14 show drawings of marked-up images.
Figure 7:
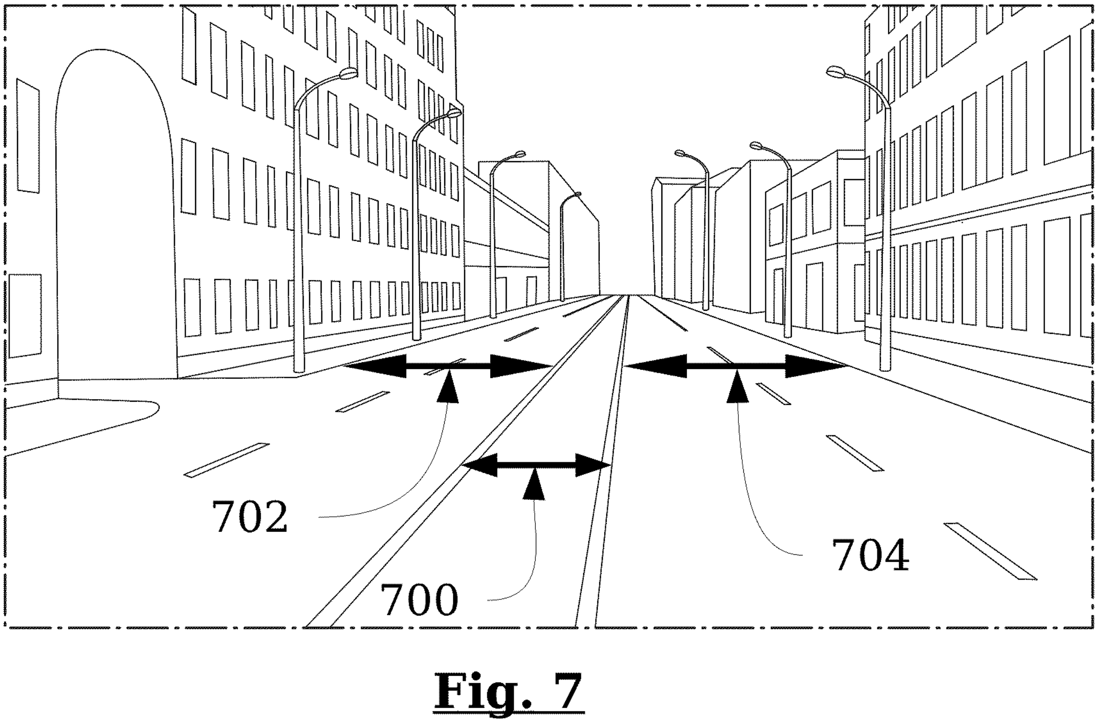

FIGS. 6 and 7 show schematic drawings of roads to illustrate the definitions of the road-related terms.

FIG. 6 shows a schematic drawing of a road 600. The road 600 comprises a part accessible to vehicular traffic, referred to as carriageway 602. The carriageway comprises a plurality of traffic lanes, e. g. traffic lane 604. According to traffic rules, traffic has to move is a prescribed direction on each lane, and taking turns over the central double line that separates both directions is forbidden. However, in the absence of a physical barrier, such as a curb, that prevents a turn, any vehicle is deemed to be able to move on the entire carriageway. In particular, only leaving the carriageway is considered taking a turn.

FIG. 7 shows a schematic drawing of a road comprising a central reservation 700. The central reservation is covered with a lawn that cannot be crossed by a vehicle. Accordingly, the road comprises two separate carriageways 702, 704. However, if in an alternative example, the central reservation is only painted on, the road is considered to comprise only one carriageway. By definition, changing a direction by a vehicle refers to crossing a road border, i. e. a border of a carriageway.

FIGS. 8-14 show drawings of marked-up images. The drawings correspond to photographic images that may be used as input to the artificial neural network. Continuous lines depict turn lines as may be created by manual labelling and comprised in the training dataset. Dashed lines depict road border sections at which the physical barrier, such as a curb, is interrupted so that a change in direction is a priori possible, but where no turn line is defined to improve the quality of the training of the artificial neural network, in particular to increase its reliability.

Figure 8:
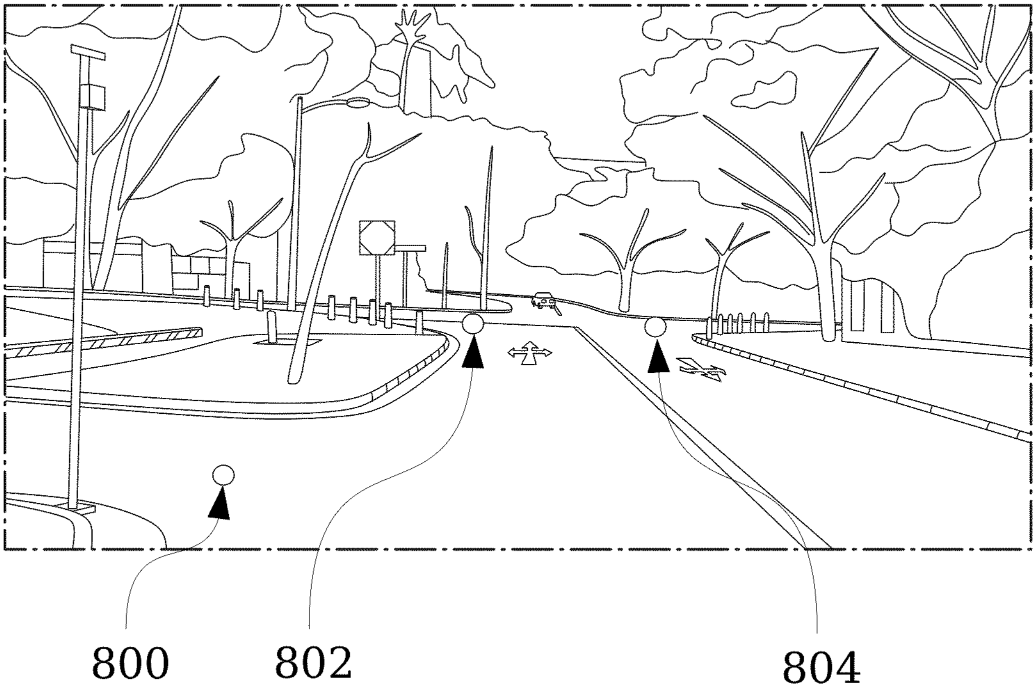

FIG. 8 shows a drawing of a marked-up image. The image shows a street with an intersection to the left and a crossroads ahead. The street is shown from the point of view of a vehicle driving on the left. The carriageway of the main road is defined by both lanes, including the lane in the opposite direction to the right. The vehicle can leave the carriageway and thereby change direction at three places: First, the carriageway can be left through the junction to the left. The barrier is a temporary obstacle, and therefore, a vehicle can change direction and leave the carriageway here. Accordingly, a turn point 800 is located to mark a position where a vehicle can change directions. At the crossroads, the vehicle can turn to the left or right. Therefore, two further turn points 802, 804, are marked. A vehicle on the main road can also go straight on. This is not marked by a turn point since this is not a change in direction.

Figure 9:
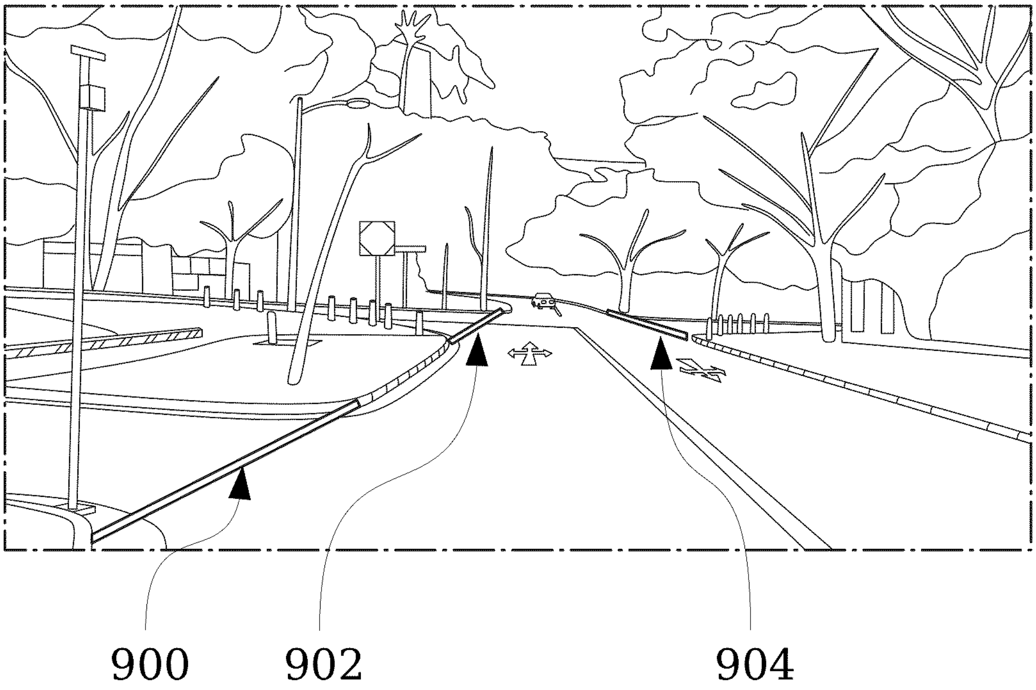

FIG. 9 shows a drawing of the same image, where the turn point markers are turn lines 900, 902, 904. The turn lines lead from one edge of the crossing road to another edge of the crossing road. Turn lines can be more precisely positioned by manual labelling by an expert. The turn lines are oriented in the direction of the road borders.

Figure 10:
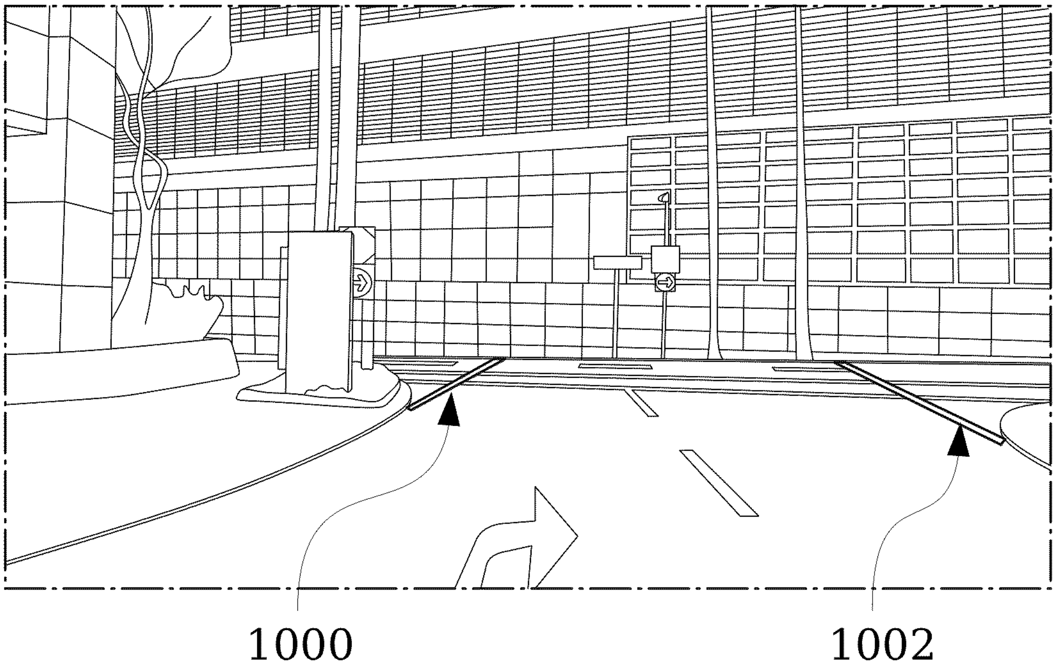

FIG. 10 shows a drawing of a further image, marked-up with turn lines. The image shows a T-shaped three-way crossroads. The road border has to be crossed to take a turn to the left or right. The turn lines 1000, 1002 are indicated such that they extend in the same direction as the curbs that form the road border in the foreground of the image, i. e. as if the road were to continue straight on.

Figure 11:
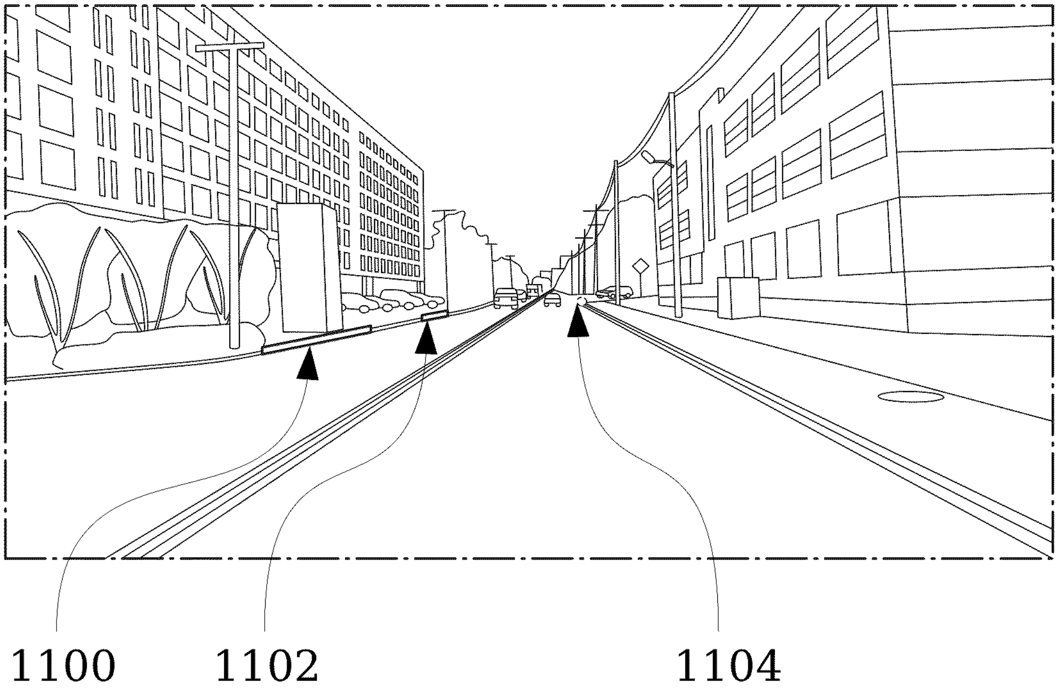

FIG. 11 shows a drawing of a further image, marked-up with turn lines. Two exits to the parking lot to the left are marked with turn lines 1100, 1102. However, the junctions 1104 to the right are so far away that a determination of length, position, and orientation is limited at final image resolution. Therefore, the training dataset does not comprise any turn line related to these junctions.

Figure 12:
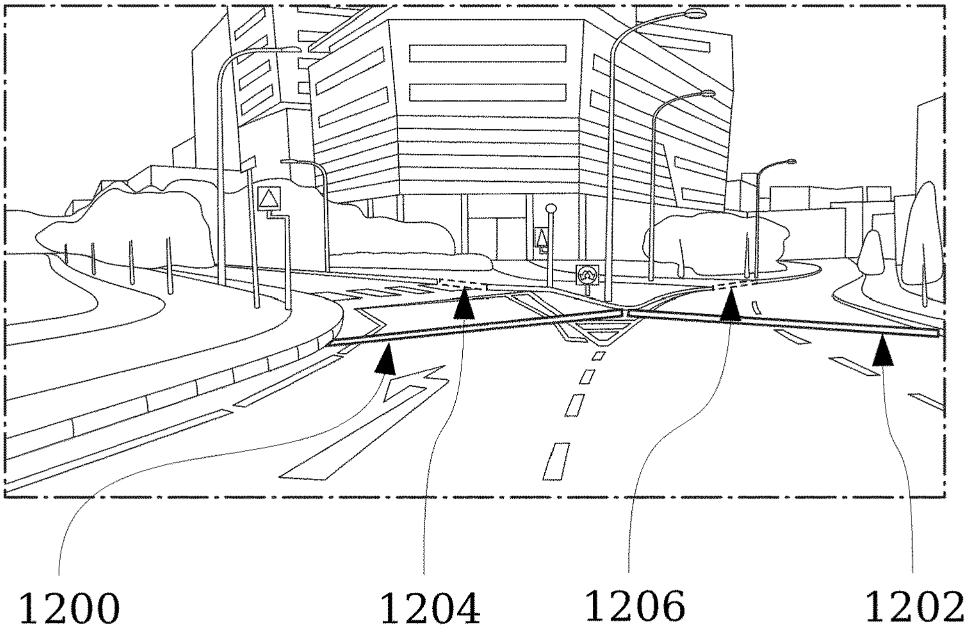

FIG. 12 shows a drawing of a further image, marked-up with turn lines. The image shows a Y-junction where the carriageway of the main road ends, and a vehicle can take either a turn to the left via turn line 1202, or to the right, via turn line 1202. Turn lines 1200 and 1202 do not stretch from one road border to a second road border. Therefore, their orientation is defined as being perpendicular to the traffic crossing the turn lines. This allows reliable prediction of turn lines in the absence of other indicators, such as road borders, for direction.

In contrast, at sections 1204 and 1206, no turn lines are defined. This is because the carriageway of the main road ends already at turn lines 1200 and 1202, such that sections 1204 and 1206 do not form part of its boundaries. Rather, sections 1204 and 1206 lie entirely outside the carriageway. Furthermore, a turn of a vehicle at section 1204 would lead to entering a walkway at a pedestrian crossing. By not including sections 1204 and 1206 into the training dataset, training increases the reliability of the artificial neural network.

Figure 13:
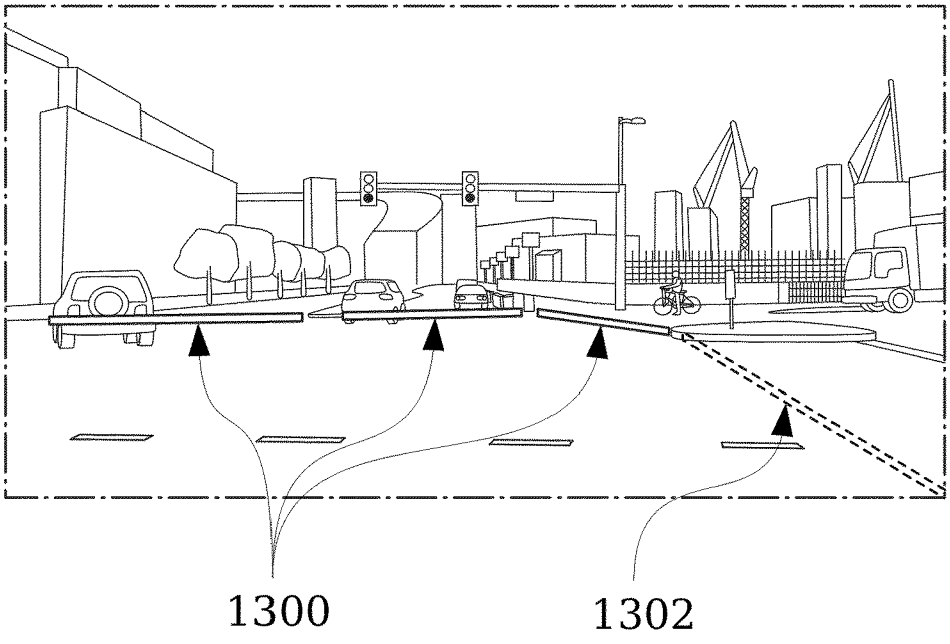

FIG. 13 shows a drawing of a further image, marked-up with turn lines. The image depicts a complex crossroads where the vehicle on the main road can change direction by leaving the carriageway upon crossing any of three turn lines 1300. The turn lines are oriented perpendicularly to a direction of movement of a vehicle leaving the carriageway. The turn lines are defined since the ends of the border sections are visible on the image. Occlusion of a central portion of the border section is unproblematic as it does not diminish the quality of the artificial neural network upon training. In contrast, at road border section 1302, no turn line is included because only one end of the turn line is visible. Therefore, no turn line is defined at road border section 1302 since no information on the lateral extent can be included. This increases the accuracy in the determination of the turn point by the trained artificial neural network.

Figure 14:
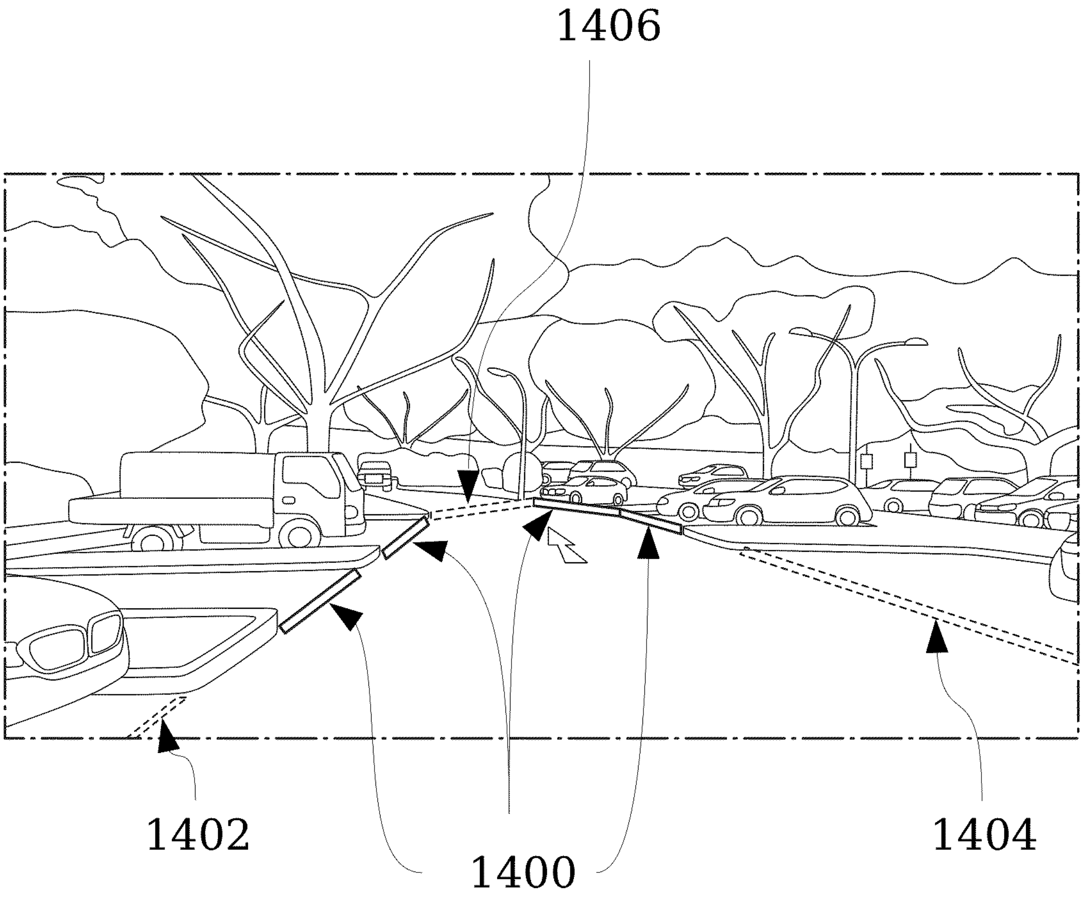

FIG. 14 shows a drawing of a further image, marked-up with turn lines. The image depicts a parking lot where a main road comprises a carriageway with curbs at the borders. The curbs are interrupted at border sections that lead to parking spaces. Accordingly, turn lines 1400 are located at road border sections where the main road borders a parking space. In contrast, for each of the road border sections 1402 and 1404, only one end of the section is visible. Therefore, no turn lines are comprised in the training dataset for these road border sections. Furthermore, at line 1406, the carriageway of the road does not end. Therefore, line 1406 is not a turn line either.

REFERENCE SIGNS

100 Computer-implemented method for a training phase
102-112 Steps of method 100
200 Computer-implemented method for an inference phase
202-210 Steps of method 200
300 Artificial neural network
302 Image
304 Input layer
306 Hidden layers
308 Output layer
310 Heat map outputs for turn points
312 Heat map outputs for turn lines
314 Heat map outputs for road segments
400 System
402 Server
404 Input device(s)
406 Processing device
408 Memory
410 Network
412 Client device
414 Camera
416 Processing unit
418 Memory
500 Training dataset
502 Datasheet
504 Image
506 Turn point label(s)
508 Turn line label(s)
510 Segment boundary label(s)
512 Segment type label(s)
600 Road
602 Carriageway
604 Lane
700 Central reservation
702, 704 Carriageway
800-804 Turn points
900-904 Turn lines
1000, 1002 Turn lines
1100, 1102 Turn lines
1104 Border section
1200, 1202 Turn lines
1204, 1206 Border sections
1300 Turn lines
1400 Turn lines
1402, 1404 Border sections
1406 Line on carriageway

The invention claimed is:

1. A computer-implemented method for predicting one or more turn points related to a road a vehicle is travelling on, the one or more turn points indicating locations where the vehicle can change direction, the method comprising:
obtaining training images of roads and their environment;
receiving labels associated with the roads on the training images, each label comprising a training turn marker, wherein each training turn marker comprises a turn line indicative of a road border section where a vehicle can change travelling direction and physically exit a carriageway of the road, wherein a turn line indicates the road border section only if the beginning and the end of the road border section are visible on the training image;
training an artificial neural network on a training dataset to predict one or more turn points, wherein the training dataset comprises the received labels and the obtained training images;
recording at least one road image of a road and its environment; and
processing the road image by the artificial neural network to predict one or more turn points on the road image.

2. The method of claim 1,
wherein each training turn marker further comprises a turn point.

3. The method of claim 1,
further comprising determining, for each turn line, a turn point at the centre of the turn line.

4. The method of claim 1, wherein a turn line indicates a road border section comprising a section of a road border of a main road where:
the main road forms a junction, an intersection, or a crossroads to a crossed road; and/or
an exit of a main road is blocked by a temporary barrier, a physical separating strip, and/or traffic signage blocking traffic.

5. The method of claim 1, wherein a turn line does not indicate a road border section of a main road where one or more of the following apply:

the main road is crossed by a crosswalk, the main road is curved without comprising any of a junction, intersection or crossroads, an edge of a road border section is invisible on the training image, and/or an edge of a road that is not an edge of a carriageway of the road.

6. The method of claim 1, wherein the training images include training images with randomly added shadows, colour transformations, horizontal flipping, blurring, random resizing and/or random cropping.

7. The method of claim 1, wherein the artificial neural network comprises an output layer comprising outputs indicative of heat maps indicative of one or more of turn lines, turn points, and road segments.

8. The method of claim 7, further comprising, for each heat map:

applying a step function to set values below a predefined threshold to zero and all other values to one, determining one or more contiguous zones of non-zero values, and for each zone, determining a centre of mass position of the zone as a turn point.

9. The method of claim 1, further comprising applying a Gaussian filter to the labels of the training dataset.

10. The method of claim 1, wherein training the artificial neural network comprises minimizing a mean squared error of the predicted turn points with respect to the training turn markers.

11. The method of claim 10, further comprising:

determining a confidence value for the predicted turn points on one or more road images;

comparing the confidence value to a predetermined threshold; and including the one or more road images into the training dataset as training images if the confidence value is below the threshold.

12. The method of claim 10, further comprising:

displaying the road image and/or other environmental data, superimposed with graphical and/or text output based on the predicted turn points.

13. The method of claim 1, wherein the steps of recording the road image and processing the road image are executed by a computer attached to or comprised in a mobile device.

14. The method of claim 1, wherein the training dataset further comprises:

at least one label indicating a boundary of at least one image segment; and/or for each image segment, a label for a segment type indicating an object represented by the segment; and wherein training and/or processing includes predicting boundaries and/or types of image segments.

15. The method of claim 14, wherein predicting boundaries and types of image segments comprises application of online hard example mining, and/or wherein training comprises applying a binary cross-entropy loss function.

16. The method of claim 1, further comprising recording the training and/or inference images by a vehicle-mounted camera.

17. The method of claim 1, further comprising:

recording the training images at a fixed frame rate, and removing each training image if it depicts the same junction as a second training image.

18. A system for predicting turn points indicating locations where the vehicle can change direction, the system comprising means for executing the steps of claim 13.

* * * * *